United States Patent
Kyprianou

(10) Patent No.: US 9,081,745 B2
(45) Date of Patent: Jul. 14, 2015

(54) METHODS AND DEVICES FOR CONFIGURING A DEVICE BASED ON PERSONAL IDENTIFICATION INFORMATION

(75) Inventor: Nikos Kyprianou, Toronto (CA)

(73) Assignee: BLACKBERRY LIMITED, Waterloo, Ontario (CA)

( * ) Notice: Subject to any disclaimer, the term of this patent is extended or adjusted under 35 U.S.C. 154(b) by 427 days.

(21) Appl. No.: 13/634,927

(22) PCT Filed: Nov. 14, 2011

(86) PCT No.: PCT/CA2011/050701
§ 371 (c)(1),
(2), (4) Date: Sep. 14, 2012

(87) PCT Pub. No.: WO2013/071391
PCT Pub. Date: May 23, 2013

(65) Prior Publication Data
US 2013/0145138 A1    Jun. 6, 2013

(51) Int. Cl.
*G06F 9/00* (2006.01)
*G06F 9/24* (2006.01)
*G06F 15/177* (2006.01)
*G06F 9/445* (2006.01)
*G06Q 10/10* (2012.01)
*H04L 12/58* (2006.01)

(52) U.S. Cl.
CPC ........... *G06F 15/177* (2013.01); *G06F 8/61* (2013.01); *G06F 9/44505* (2013.01); *G06Q 10/107* (2013.01); *H04L 51/04* (2013.01); *H04L 51/28* (2013.01)

(58) Field of Classification Search
None
See application file for complete search history.

(56) References Cited

U.S. PATENT DOCUMENTS

| | | | |
|---|---|---|---|
| 6,460,175 B1 | 10/2002 | Ferri et al. | |
| 6,966,060 B1 | 11/2005 | Young et al. | |
| 7,266,818 B2 | 9/2007 | Pike et al. | |
| 7,594,225 B2 | 9/2009 | Barr et al. | |
| 7,596,785 B2* | 9/2009 | Burkhardt et al. | 717/174 |
| 8,122,031 B1* | 2/2012 | Mauro et al. | 707/748 |
| 8,528,033 B2* | 9/2013 | McCarthy et al. | 725/110 |
| 2002/0095663 A1 | 7/2002 | Joory | |
| 2005/0245249 A1 | 11/2005 | Wierman et al. | |
| 2007/0259678 A1* | 11/2007 | Kuk et al. | 455/466 |
| 2009/0158272 A1 | 6/2009 | El-Assir et al. | |
| 2009/0227245 A1 | 9/2009 | Fersman et al. | |
| 2009/0288079 A1* | 11/2009 | Zuber et al. | 717/176 |

(Continued)

FOREIGN PATENT DOCUMENTS

| | | |
|---|---|---|
| EP | 1990952 | 11/2008 |
| WO | WO2007/140337 | 12/2007 |

OTHER PUBLICATIONS

International Search Report dated Jun. 5, 2012.

(Continued)

*Primary Examiner* — Ji H Bae
(74) *Attorney, Agent, or Firm* — Rowand LLP

(57) ABSTRACT

Methods and electronic devices for configuring an electronic device based on personal identification information are described. In one example aspect, the method may include: obtaining personal identification information in a first application; and based on the personal identification information and one or more predetermined rules, determining if a second application should be loaded onto the electronic device.

19 Claims, 7 Drawing Sheets

(56) References Cited

U.S. PATENT DOCUMENTS

2010/0138299 A1* 6/2010 Preston et al. ............. 705/14.53
2010/0217614 A1* 8/2010 Brown et al. ................. 705/1.1
2010/0250907 A1 9/2010 Dehann
2012/0260192 A1* 10/2012 Detweiler .................... 715/745

OTHER PUBLICATIONS

Amit Banerjee, Techie Buzz, http://techie-buzz.com/softwares/install-multiple-freeware-at-once.html, Aug. 13, 2010.

http://windows.microsoft.com/en-US/windows-xp/help/setup/install-windows-xp, May 19, 2011.

All My Apps: Install Multiple Programs at Once, http://www.makeuseof.com/dir/allmyapps-install-multiple-programs-at-once/, Mar. 29, 2010.

Merlin, Projects Wizards, Integration Applications, http://www.projectwizards.net/en/merlin/?f=allformats, Mar. 26, 2010.

* cited by examiner

PERSONAL IDENTIFICATION INFORMATION 300

NAME: John Doe ⌒ 311
PHONE NUMBER: 999-999-9999 ⌒ 321
EMAIL ADDRESS: jdoe@domainname.com ⌒ 331
⎵ ⎵
331a  331b
MAILING ADDRESS: 123 Avenue, Toronto, Ontario ⌒ 341
INSTANT MESSAGING ACCOUNT:
    PROVIDER: Yahoo ⌒ 350 ⎫
    USERNAME: Jdoe123 ⌒ 351 ⎬ 309
    PASSWORD: abcd789 ⌒ 352 ⎭
INTEREST(S): Football ⌒ 361

FIG. 2

METHODS AND DEVICES FOR CONFIGURING A DEVICE BASED ON PERSONAL IDENTIFICATION INFORMATION

TECHNICAL FIELD

The present application relates to methods and systems for application management and configuration, and more particularly to methods and electronic devices for configuring an electronic device based on personal identification information.

BACKGROUND

Electronic devices are sometimes preloaded with software. Some preloaded software, such as operating system software, may provide basic functions on the electronic device such as the ability to execute other applications, control peripherals, etc.

Additional applications which expand the functionality of the electronic device may also be preloaded on the electronic device. By way of example, electronic devices are sometimes preloaded with one or more instant messaging applications. The instant messaging application(s) may allow a user of the electronic device to engage in instant messaging (IM) with users of other electronic devices 201. Preloading applications may be convenient for a user since it provides for expanded functionality on the electronic device; however, a user may not use all preloaded applications. Thus, preloading applications may unnecessarily occupy resources (such as memory) of an electronic device.

Electronic devices typically allow a user of an electronic device to install additional applications on the electronic device. That is, a user may manually load applications onto the electronic device. Loading such applications onto the electronic device may be time consuming for a user and may also occupy resources (such as wireless bandwidth, battery power, etc.) while a user locates, and possibly downloads and installs such applications.

BRIEF DESCRIPTION OF THE DRAWINGS

Reference will now be made, by way of example, to the accompanying drawings which show example embodiments of the present disclosure, and in which:

FIG. 2 is a block diagram illustrating example personal identification information in accordance with example embodiments of the present disclosure;

Like reference numerals are used in the drawings to denote like elements and features.

DETAILED DESCRIPTION

In one example aspect, the present application describes a method implemented by a processor of an electronic device. The method includes: obtaining personal identification information in a first application; and based on the personal identification information and one or more predetermined rules, determining if a second application should be loaded onto the electronic device.

In another example aspect, the present application describes an electronic device. The electronic device includes a memory and a processor coupled with the memory. The processor is configured to: obtain personal identification information in a first application; and based on the personal identification information and one or more predetermined rules, determine if a second application should be loaded onto the electronic device.

In yet another example aspect, the present application describes a method implemented by a processor of an electronic device. The method includes: obtaining personal identification information in a first application; and configuring a second application based on the personal identification information obtained in the first application.

Other example embodiments of the present disclosure will be apparent to those of ordinary skill in the art from a review of the following detailed description in conjunction with the drawings.

Example embodiments of the present disclosure are not limited to any particular operating system, mobile device architecture, server architecture or computer programming language.

Example Electronic Device

Figure 1:
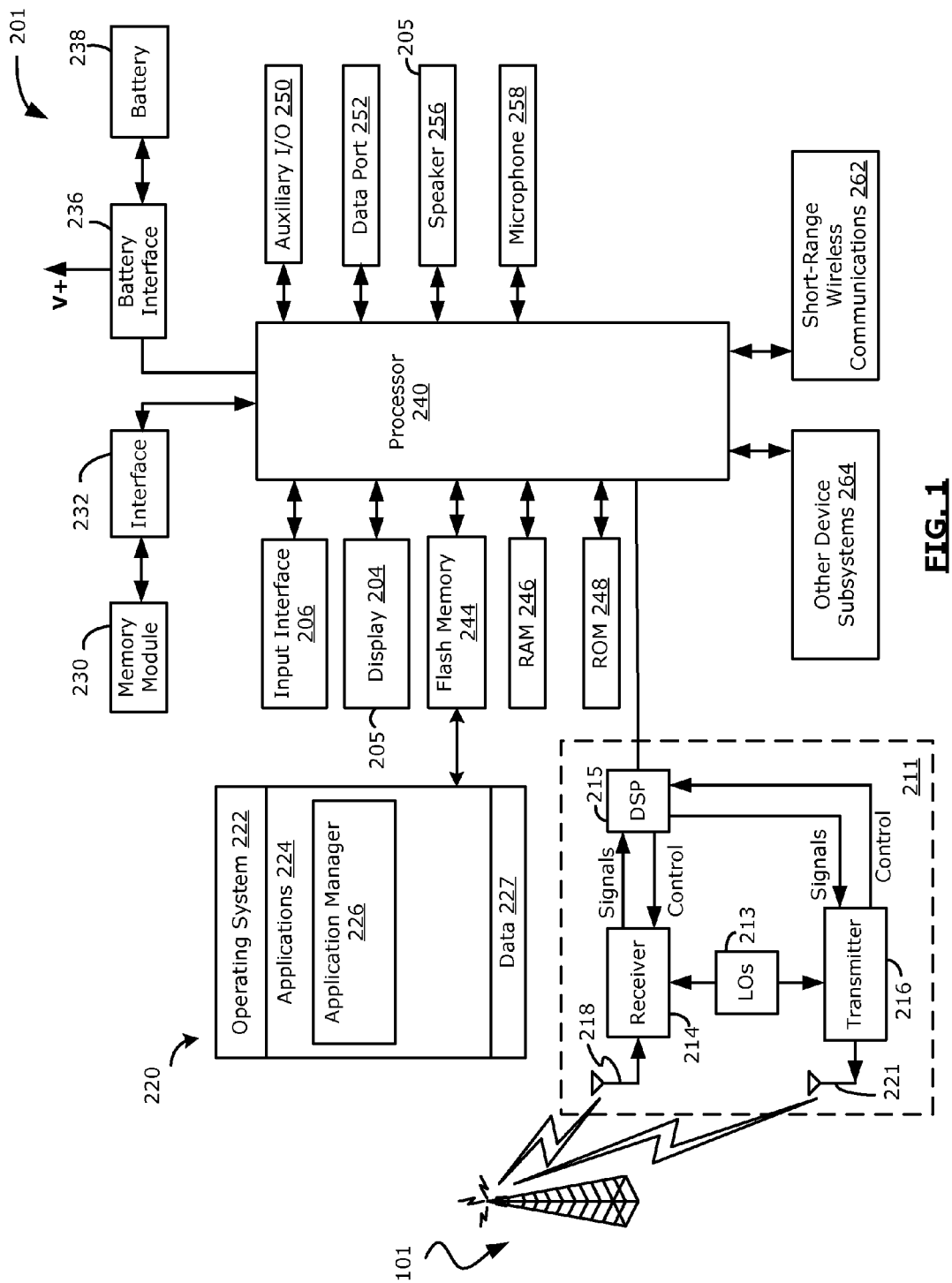
FIG. 1 is a block diagram illustrating an example electronic device in accordance with example embodiments of the present disclosure.

Reference is first made to FIG. 1 which illustrates an example electronic device 201. In the illustrated example embodiment, the electronic device 201 is a communication device, such as a mobile communication device. In at least some example embodiments, the electronic device 201 is a two-way communication device having data and voice communication capabilities, and the capability to communicate with other computer systems, for example, via the Internet. Depending on the functionality provided by the electronic device 201, in various example embodiments the electronic device 201 may be a multiple-mode communication device configured for both data and voice communication, a mobile telephone such as a smartphone, a tablet computer such as a slate computer, a wearable computer such as a watch, a PDA (personal digital assistant) or a computer system. In other example embodiments, the electronic device 201 may be of a type not specifically listed above.

Accordingly, in at least some example embodiments, the electronic device 201 may be a smartphone. A smartphone is a mobile phone which offers more advanced computing capability than a basic non-smartphone cellular phone. For example, a smartphone may have the ability to run third party applications which are stored on the smartphone.

Similarly, in at least some example embodiments, the electronic device 201 may be a tablet computer. A tablet computer (which may also be referred to as a tablet) is an electronic device 201 which is generally larger than a mobile phone (such as a smartphone) or personal digital assistant. Many mobile phones or personal digital assistants are designed to be pocket sized. That is, mobile phones or personal digital assistants are generally small enough to be carried by a person easily, often in a shirt or pant pocket while tablet computers are larger and may not fit within pant pockets. For example, many tablet computers have a height which is seven inches (7") or more. In some example embodiments, the tablet computer may be a slate computer. A slate computer is a tablet computer which does not include a dedicated keyboard. A slate computer may allow for text input through the use of a virtual keyboard or an external keyboard which connects to the slate computer via a wired or wireless connection.

The electronic device 201 includes a housing (not shown) housing the components of the electronic device 201. The internal components of the electronic device 201 are constructed on a printed circuit board (PCB). The electronic device 201 includes a controller comprising at least one processor 240 (such as a microprocessor) which controls the overall operation of the electronic device 201. The processor 240 interacts with device subsystems such as a wireless communication subsystem 211 for exchanging radio frequency signals with a wireless network 101 to perform communication functions. The processor 240 interacts with additional device subsystems including input interfaces 206 (such as a keyboard, one or more control buttons, one or more microphones 258, and/or a touch-sensitive overlay associated with a touchscreen display), flash memory 244, random access memory (RAM) 246, read only memory (ROM) 248, auxiliary input/output (I/O) subsystems 250, a data port 252 (which may be a serial data port, such as a Universal Serial Bus (USB) data port), one or more output interfaces 205 (such as a display 204 (which may be a liquid crystal display (LCD)), one or more speakers 256, or other output interfaces 205), a short-range communication subsystem 262, and other device subsystems generally designated as 264. Some of the subsystems shown in FIG. 1 perform communication-related functions, whereas other subsystems may provide "resident" or on-device functions.

The electronic device 201 may include a touchscreen display in some example embodiments. The touchscreen display may be constructed using a touch-sensitive input surface connected to an electronic controller. The touch-sensitive input surface overlays the display 204 and may be referred to as a touch-sensitive overlay. The touch-sensitive overlay and the electronic controller provide a touch-sensitive input interface 206 and the processor 240 interacts with the touch-sensitive overlay via the electronic controller. That is, the touchscreen display acts as both an input interface 206 and an output interface 205.

The communication subsystem 211 includes a receiver 214, a transmitter 216, and associated components, such as one or more antenna elements 218 and 221, local oscillators (LOs) 213, and a processing module such as a digital signal processor (DSP) 215. The antenna elements 218 and 221 may be embedded or internal to the electronic device 201 and a single antenna may be shared by both receiver 214 and transmitter 216, as is known in the art. The particular design of the wireless communication subsystem 211 depends on the wireless network 101 in which electronic device 201 is intended to operate.

The electronic device 201 may communicate with any one of a plurality of fixed transceiver base stations of the wireless network 101 within its geographic coverage area. The mobile device 201 may send and receive communication signals over the wireless network 101 after the required network registration or activation procedures have been completed. Signals received by the antenna 218 through the wireless network 101 are input to the receiver 214, which may perform such common receiver functions as signal amplification, frequency down conversion, filtering, channel selection, etc., as well as analog-to-digital (A/D) conversion. A/D conversion of a received signal allows more complex communication functions such as demodulation and decoding to be performed in the DSP 215. In a similar manner, signals to be transmitted are processed, including modulation and encoding, for example, by the DSP 215. These DSP-processed signals are input to the transmitter 216 for digital-to-analog (D/A) conversion, frequency up conversion, filtering, amplification, and transmission to the wireless network 101 via the antenna 218. The DSP 215 not only processes communication signals, but may also provide for receiver and transmitter control. For example, the gains applied to communication signals in the receiver 214 and the transmitter 216 may be adaptively controlled through automatic gain control algorithms implemented in the DSP 215.

In some example embodiments, the auxiliary input/output (I/O) subsystems 250 may comprise an external communication link or interface, for example, an Ethernet connection. The electronic device 201 may comprise other wireless communication interfaces for communicating with other types of wireless networks, for example, a wireless network such as an orthogonal frequency division multiplexed (OFDM) network. The auxiliary I/O subsystems 250 may include a pointing or navigational tool (input device) such as a clickable trackball or scroll wheel or thumbwheel, or a vibrator for providing vibratory notifications in response to various events on the electronic device 201 such as receipt of an electronic message or incoming phone call, or for other purposes such as haptic feedback (touch feedback).

In some example embodiments, the electronic device 201 also includes a removable memory module 230 (typically comprising flash memory) and a memory module interface 232. Network access may be associated with a subscriber or user of the electronic device 201 via the memory module 230, which may be a Subscriber Identity Module (SIM) card for use in a GSM network or other type of memory module for use in the relevant wireless network type. The memory module 230 may be inserted in or connected to the memory module interface 232 of the electronic device 201.

The electronic device 201 may store data 227 in an erasable persistent memory, which in one example embodiment is the flash memory 244. In various example embodiments, the data 227 may include service data having information required by the electronic device 201 to establish and maintain communication with the wireless network 101. The data 227 may also include user application data such as email messages, address book and contact information, calendar and schedule information, notepad documents, image files, and other commonly stored user information stored on the electronic device 201 by its user, and other data. The data 227 stored in the persistent memory (e.g. flash memory 244) of the electronic device 201 may be organized, at least partially, into a number of databases or data stores each containing data items of the same data type or associated with the same application. For example, email messages, contact records, and task items may be stored in individual databases within the electronic device 201 memory.

The data port 252 may be used for synchronization with a user's host computer system (not shown). The data port 252 enables a user to set preferences through an external device or software application and extends the capabilities of the electronic device 201 by providing for information or software downloads to the electronic device 201 other than through the wireless network 101. The alternate download path may for example, be used to load an encryption key onto the electronic device 201 through a direct, reliable and trusted connection to thereby provide secure device communication.

In some example embodiments, the electronic device 201 is provided with a service routing application programming interface (API) which provides an application with the ability to route traffic through a serial data (i.e., USB) or Bluetooth® (Bluetooth® is a registered trademark of Bluetooth SIG, Inc.) connection to the host computer system using standard connectivity protocols. When a user connects their electronic device 201 to the host computer system via a USB cable or Bluetooth® connection, traffic that was destined for the wireless network 101 is automatically routed to the electronic device 201 using the USB cable or Bluetooth® connection. Similarly, any traffic destined for the wireless network 101 is automatically sent over the USB cable Bluetooth® connection to the host computer system for processing.

The electronic device 201 also includes a battery 238 as a power source, which is typically one or more rechargeable batteries that may be charged, for example, through charging circuitry coupled to a battery interface such as the serial data port 252. The battery 238 provides electrical power to at least some of the electrical circuitry in the electronic device 201, and the battery interface 236 provides a mechanical and electrical connection for the battery 238. The battery interface 236 is coupled to a regulator (not shown) which provides power V+ to the circuitry of the electronic device 201.

The short-range communication subsystem 262 is an additional optional component which provides for communication between the electronic device 201 and different systems or devices, which need not necessarily be similar devices. For example, the short-range communication subsystem 262 may include an infrared device and associated circuits and components, or a wireless bus protocol compliant communication mechanism such as a Bluetooth® communication module to provide for communication with similarly-enabled systems and devices.

A predetermined set of applications that control basic device operations, including data and possibly voice communication applications will normally be installed on the electronic device 201 during or after manufacture. Additional applications and/or upgrades to the operating system 222 or software applications 224 may also be loaded onto the electronic device 201 through the wireless network 101, the auxiliary I/O subsystem 250, the data port 252, the short-range communication subsystem 262, or other suitable device subsystems 264. The downloaded programs or code modules may be permanently installed, for example, written into the program memory (e.g. the flash memory 244), or written into and executed from the RAM 246 for execution by the processor 240 at runtime. Such flexibility in application installation increases the functionality of the electronic device 201 and may provide enhanced on-device functions, communication-related functions, or both. For example, secure communication applications may enable electronic commerce functions and other such financial transactions to be performed using the electronic device 201.

In some example embodiments, the electronic device 201 may provide two principal modes of communication: a data communication mode and a voice communication mode. In the data communication mode, a received data signal such as a text message, an email message, or web page download will be processed by the communication subsystem 211 and input to the processor 240 for further processing. For example, a downloaded web page may be further processed by a web browser application or an email message may be processed by the email messaging application and output to the display 204. A user of the electronic device 201 may also compose data items, such as email messages; for example, using an input interface 206 in conjunction with the display 204. These composed items may be transmitted through the communication subsystem 211 over the wireless network 101.

In the voice communication mode, the electronic device 201 provides telephony functions and operates as a typical cellular phone. The overall operation is similar to the data communication mode, except that the received signals would be output to the speaker 256 and signals for transmission would be generated by a transducer such as the microphone 258. The telephony functions are provided by a combination of software/firmware (i.e., a voice communication module) and hardware (i.e., the microphone 258, the speaker 256 and input devices). Alternative voice or audio I/O subsystems, such as a voice message recording subsystem, may also be implemented on the electronic device 201. Although voice or audio signal output is typically accomplished primarily through the speaker 256, the display 204 may also be used to provide an indication of the identity of a calling party, duration of a voice call, or other voice call related information.

The processor 240 operates under stored program control and executes software modules 220 stored in memory such as persistent memory; for example, in the flash memory 244. As illustrated in FIG. 1, the software modules 220 include operating system software 222, and software applications 224 including an application manager 226. In the example embodiment of FIG. 1, the application manager 226 is implemented as a separate stand-alone application 224, but in other example embodiments, the application manager 226 could be implemented as part of the operating system 222 or another application 224.

The electronic device 201 may include a range of additional software applications 224, including, for example, a notepad application, web browser application, voice communication (i.e. telephony) application, mapping application, or a media player application, or any combination thereof. Each of the software applications 224 may include layout information defining the placement of particular fields and graphic elements (e.g. text fields, input fields, icons, etc.) in the user interface (i.e. the display 204) according to the application.

The software modules 220 or parts thereof may be temporarily loaded into volatile memory such as the RAM 246. The RAM 246 is used for storing runtime data variables and other types of data or information. Although specific functions are described for various types of memory, this is merely one example, and a different assignment of functions to types of memory could also be used.

The operating system 222 is software that manages electronic device 201 components (such as the display 204, input interface 206, communication subsystem 211, etc.) and provides a platform for software applications 224. The operating system 222 also acts as an intermediary between the electronic device 201 components and the software applications 224. For example, the operating system may recognize data that is being input from a navigational input device and route the inputted data to be executed by a software application 224. The operating system 222 may be Microsoft Windows OS™, BlackBerry OS™, iOS™, Linux™, UNIX™ Android™ or any other operating system 222 having the necessary capabilities for implementing the functions described herein.

In at least some example embodiments, a first application associated with the electronic device 201, such as the operating system 222, is configured to obtain personal identification information from a user of the electronic device 201. As will be described in greater detail with reference to FIG. 2 below, the personal identification information may include one or more names, phone numbers, email addresses, instant messaging account information, etc. In some example embodiments, the first application (e.g. the operating system 222) may obtain such personal identification information during a first start of the first application.

The application manager 226 (which may be a component in the first application or may be separate from the first application) is configured to determine, based on the personal identification information and one or more predetermined rules, whether another application (which may be referred to as a second application) should be loaded onto the electronic device. For example, in at least some example embodiments, the one or more predetermined rules may specify that an instant messaging application should be loaded onto the electronic device 201 if instant messaging account information is specified in the personal identification information. In such example embodiments, the application manager 226 may determine if the personal identification information specifies instant messaging account information and if so, it may determine that an instant messaging application should be loaded onto the electronic device.

In at least some example embodiments, if the application manager 226 determines that the second application should be loaded onto the electronic device 201 it may automatically download, install and/or configure the second application to the electronic device 201.

Thus, the application manager 226 may facilitate the identification, download, installation and/or configuration of one or more applications which may be useful to the user of the electronic device 201.

Specific functions and features of the application manager 226 will be discussed in greater detail below with reference to FIGS. 3 to 7.

In at least some example embodiments, the operating system 222 may perform some or all of the functions of the application manager 226. In other example embodiments, the functions or a portion of the functions of the application manager 226 may be performed by one or more other applications. Further, while the application manager 226 has been illustrated as a single block, the application manager 226 may include a plurality of software modules. In at least some example embodiments, these software modules may be divided among multiple applications.

Personal Identification Information

Accordingly, in at least some example embodiments, personal identification information is obtained by the electronic device 201 and the personal identification information is used in order to identify, download, install and/or configure another application.

Reference will now be made to FIG. 2, which shows example personal identification information 300. The personal identification information 300 may be obtained by the operating system 222, the application manager 226 and/or other applications on the electronic device 201. In at least some example embodiments, the operating system, application manager 226 and/or other applications on the electronic device 201 may display one or more user interface screens (not shown) which allow a user of the electronic device 201 to input the personal identification information 300. One or more of the user interface screens may have one or more interface elements which permit personal identification information 300 to be input to the electronic device 201. That is, the one or more user interface screens may act as a form and receive data. In at least some example embodiments, personal identification information 300 may be received via one or more of the following interface elements: text fields, radio buttons, checkboxes, selections from a menu, and/or password fields (in which text entered by a user is not displayed). Personal identification information 300 may be received via other interface elements not specifically listed herein. Different types of interface elements may be used for the input of different types of personal identification information 300.

A user of the electronic device 201 may input the personal identification information 300 using an input interface 206 associated with the electronic device 201. For example, a user may interact with the interface elements to input the personal identification information 300. In other example embodiments, at least some of the personal identification information 300 may be received via another method. For example, after a user has input information associated with an account which may contain other personal identification information 300 (such as a Facebook™ account, etc.), the electronic device 201 may use the input information to log into the account and retrieve the other personal identification information 300.

In at least some example embodiments, after the personal identification information 300 is obtained, it may be stored in memory of the electronic device 201. For example, the personal identification information 300 may be stored in the data area 227 of memory (such as the flash memory 244).

The personal identification information 300 may include for example, one or more names 311 (which may for example, include a first name, middle name, last name and/or nickname), one or more mailing addresses 341 (such as a residential and/or business address), an electronic messaging address, such as an email address 331 (which may include a local-part portion 331a and a domain name portion 331b), one or more phone numbers 321 (such as a home phone number, a business phone number, a mobile phone number, etc.), instant messaging account information 309 (which may include for example, an instant messaging username 351, an instant messaging password 352 and/or an instant messaging provider 350 (which may identify the provider of the instant messaging service associated with the instant messaging username 351)), and/or one or more interests 361 (such as for example, hobbies, political affiliation, religious affiliation, favourite books, favourite movies, celebrities of interest, social groups) of the user. The personal identification information 300 may also include other personal identification information not specifically listed herein.

Automatically Determining Whether Application Should be Loaded

Reference will now be made to FIGS. 3 to 7 in which example methods 301, 400, 500, 600, 700 which utilize personal identification information are illustrated in flowchart form. The methods 301, 400, 500, 600, 700 of FIGS. 3 to 7 configure an electronic device 201 based on personal identification information. The electronic device 201 may be configured to perform any one or more of the methods 301, 400, 500, 600, 700 of FIGS. 3 to 7. In at least some example embodiments, the processor 240 of the electronic device 201 is configured to perform any one or more of the methods 301, 400, 500, 600, 700 of FIGS. 3 to 7. One or more applications 224 on the electronic device 201 may contain computer readable instructions which cause the processor 240 of the electronic device 201 to perform any one or more of the methods 301, 400, 500, 600, 700 of FIGS. 3 to 7. In at least some example embodiments, the application manager 226 (which may be a standalone application manager 226 or may be included in the operating system 222 or another application 224) is configured to perform any one or more of the methods 301, 400, 500, 600, 700 of FIGS. 3 to 7. More particularly, the application manager 226 may include computer readable instructions which, when executed, cause the processor 240 to perform any one or more of the methods 301, 400, 500, 600, 700 of FIGS. 3 to 7.

It will be appreciated that the methods 301, 400, 500, 600, 700 of FIGS. 3 to 7 may, in at least some example embodiments, be provided by other software applications or modules apart from those specifically discussed above. Accordingly, any features which are referred to as being performed by the electronic device 201 may be performed by any one or more of the software applications or modules referred to above or other software modules. Accordingly, in at least some example embodiments, at least some of the methods 301, 400, 500, 600, 700 of FIGS. 3 to 7 may be performed by or may rely on other applications 224 or modules which interface with the application manager 226.

Figure 3:
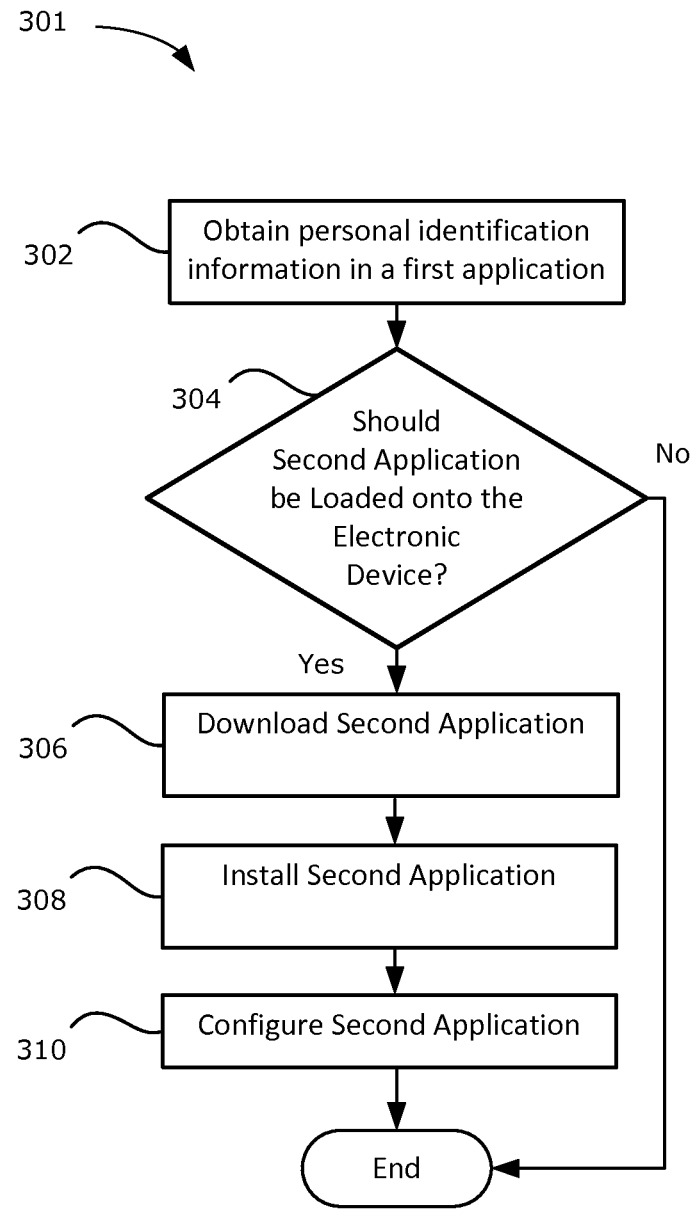
FIG. 3 is a flowchart illustrating an example method of determining whether an application should be loaded based on personal identification information in accordance with example embodiments of the present disclosure.

Referring to FIG. 3, a flowchart of an example method 301 of determining whether an application should be loaded onto an electronic device 201 is illustrated. At 302, personal identification information 300 is obtained in a first application on the electronic device 201. The personal identification information 300 may include any of the types of personal identification information 300 described above with reference to FIG. 2 such as, for example, one or more names 311, one or more mailing addresses 341, one or more email addresses 331, instant messaging account information 309, one or more interests 361, one or more phone numbers 321, etc.

In at least some example embodiments, the first application is an operating system 222. That is, operating system 222 may be configured to obtain personal identification information 300.

In at least some example embodiments, the first application (such as operating system 222) may display a request via the display 204 of the electronic device 201 to input personal identification information 300.

As discussed above with reference to FIG. 2, in at least some example embodiments, operating system 222, application manager 226 and/or other applications on the electronic device 201 may display one or more user interface screens (not shown) which allow a user of the electronic device 201 to input the personal identification information 300. One or more of the user interface screens may have one or more interface elements which permit personal identification information 300 to be input to the electronic device 201. That is, the one or more interface screens may act as a form and receive data. In at least some example embodiments, personal identification information 300 may be received via one or more of the following interface elements: text fields, radio buttons, checkboxes, selections from a menu, and/or password fields. Personal identification information 300 may be received via other interface elements not specifically listed herein.

Accordingly, the personal identification information 300 may be obtained at the electronic device 201 from an input interface 206 associated with the electronic device 201. For example, the personal identification information 300 may be input to the electronic device 201 using a navigational input device such as a trackball, track pad or touchscreen, or a physical keyboard associated with the electronic device 201.

In other example embodiments, at 302, the personal identification information 300 may be obtained by the first application (which may be the operating system 222, application manager 226, and/or another application) from memory, such as flash memory 244 of the electronic device 201. That is, in at least some example embodiments, the personal identification information 300 may be stored in a data store in the flash memory 244 of the electronic device 201 prior to 302 of FIG. 3. The operating system 222, application manager 226, and/or another application may be capable of accessing and retrieving the personal identification information 300 stored in the data store and may do so at 302.

In yet other example embodiments, the personal identification information 300 may be obtained, at 302, according to another method. For example, in at least some example embodiments, the personal identification information 300 may be obtained by the operating system 222, application manager 226, and/or another application via the communication subsystem 211 associated with the electronic device 201. For example, in at least some example embodiments, the personal identification information 300 may be in a vCard file format which may be attached to an electronic message received at the electronic device 201. A vCard is a file format standard for electronic business cards. The obtained personal identification information 300 may be in other formats not specifically discussed herein.

In at least some example embodiments, at 302, the personal identification information 300 is obtained during a first start of the first application, such as a first start of the operating system 222. For example, a user accessing the first application for the first time may be prompted to enter the personal identification information 300. In some example embodiments, after entry of the personal identification information 300, the first application may store the personal identification information 300 in memory (for example the flash memory 244) of the electronic device 201. In at least some such example embodiments, the personal identification information 300 may later be retrieved by the first application or by another application so that a user does not have to enter the same information repeatedly.

In at least some example embodiments, the first application is the operating system 222. In such example embodiments, the operating system 222 may be configured to obtain personal identification information 300. For example, in at least some example embodiments, at 302, the personal identification information 300 is obtained by the operating system 222 during the first start of the operating system 222. A user accessing a new electronic device 201 for the first time may access the operating system 222 associated with the electronic device 201 for the first time. The operating system 222 may, among other functions, prompt the user to enter personal identification information 300 during the first start of the operating system 222.

In response to obtaining the personal identification information 300, the electronic device 201, at 304, determines whether a second application (which is not the same application as the first application and which is not already loaded onto the electronic device 201) should be loaded onto the electronic device 201. This determination is made based on the personal identification information 300 obtained at 302 and based on one or more predetermined rules. The predetermined rules may specify one or more conditions related to personal identification information 300 which cause the electronic device 201 to determine that a second application should be loaded onto the electronic device 201. The predetermined rules are provided in the application manager 226. A predetermined rule may for example, associate personal identification information 300 of a specific type with a predetermined application. If at 304, the electronic device 201 determines that the personal identification information 300 obtained at 302 includes a specific predetermined type of information, then it may determine that a second application which is associated with that type of information should be loaded onto the electronic device 201.

For example, in some example embodiments, the electronic device 201 may determine whether the personal identification information 300 specifies instant messaging account information and/or whether it specifies instant messaging account information associated with a predetermined instant messaging provider 350 (FIG. 2). If so, then the electronic device 201 may determine that an instant messaging application (such as an instant messaging application associated with the instant messaging provider 350) should be loaded onto the electronic device 201. Such example embodiments will be discussed in greater detail below with reference to FIG. 5.

Similarly, in at least some example embodiments, the electronic device 201 may determine whether the personal identification information 300 includes an email address of a specific predetermined type. If so, then the electronic device 201 may determine that an email application associated with that type of email address should be loaded on the electronic device 201. By way of example, if the user specifies a Gmail™ email address in the email account information, then the electronic device 201 may determine that a Gmail™ client application should be loaded onto the electronic device. Such an example embodiment will be discussed in greater detail below with reference to FIG. 6.

In some example embodiments, personal identification information 300 may be separated into fields, each field storing personal identification information 300 of a predetermined type. In some such example embodiments, at 304, in order to determine whether a second application should be loaded onto the electronic device 201 based on the personal identification information 300, the electronic device 201 identifies one or more fields which are designed to store personal identification information 300 of a type associated with a predetermined rule. For example, in example embodiments in which a predetermined rule specifies that a second application should be loaded if an email address is input or if an email address which is input meets predetermined criteria, the electronic device 201 may look to an email address field which is expected to contain an email address.

In at least some example embodiments, 304 is performed automatically based on the predetermined rule(s) and the personal identification information 300 without assistance or further input from a user of the electronic device 201. That is, the process of determining whether a second application should be loaded based on the personal identification information 300 may be an automatic process performed by software applications 224 or modules that is not manually performed by a user. In at least some example embodiments, if the electronic device 201 determines that a second application should be loaded on the electronic device 201, then the electronic device 201 may provide notification of this recommendation to a user. For example, in at least some example embodiments, the electronic device 201 may display a notification on the display 204 of the electronic device 201 that a second application is recommended for loading onto the electronic device 201. The notification provided by the electronic device 201 may be visible (i.e. via a text and/or graphical notification provided in the display 204), auditory (i.e. via the speaker 256) and/or vibratory.

In at least some example embodiments, if it is determined by the electronic device 201 that the second application should be loaded onto the electronic device 201, then at 306, the electronic device 201 may download the second application to the electronic device 201.

In downloading the second application, the electronic device 201 may retrieve the second application from a network, or server, system or another device across a network. For example, in at least some example embodiments, the second application may be downloaded from an application server (not illustrated). In at least some example embodiments, the electronic device 201 may store the second application in memory (for example the flash memory 244) of the electronic device 201 as part of the downloading process.

In at least some example embodiments, the downloading of the second application, at 306, is performed automatically in response to the electronic device 201 obtaining the personal identification information 300. In such example embodiments, the electronic device 201 may automatically download the second application after it has been determined, at 304, that the second application should be loaded onto the electronic device. That is, in at least some example embodiments, no user interaction is required in order to initiate the download process after the personal identification information 300 is obtained by the electronic device 201.

In at least some example embodiments, if it is determined by the electronic device that the second application should be loaded onto the electronic device 201, then at 308, the electronic device 201 may install the second application to the electronic device 201.

In at least some example embodiments, the installation of the second application, at 306, is performed automatically in response to the electronic device 201 obtaining the personal identification information 300. In such example embodiments, the electronic device 201 may automatically install the second application after it has been determined, at 304, that the second application should be loaded onto the electronic device. That is, in at least some example embodiments, no user interaction is required in order to initiate the installation process after the personal identification information 300 is obtained by the electronic device 201.

Installation of the second application may include any one or more of: unpacking files associated with the second application if the files are in a compressed form, copying the files, tailoring the second application to suit the components of the electronic device 201, providing information about the second application to other applications 224 or modules in the electronic device 201, etc. In at least some example embodiments, the electronic device 201 may further store the second application in memory (for example the flash memory 244) of the electronic device 201 as part of the installation process. Accordingly, once the second application has been installed, the second application may be retrieved and executed by the electronic device 201.

In at least some example embodiments, prior to installing the second application, the electronic device 201 may test the second application for suitability with the electronic device 201. For example, in at least some example embodiments, the electronic device 201 may check the memory capabilities of the electronic device 201. If the second application is found to be incompatible for installation in the electronic device 201, the second application may not be installed in the electronic device 201. In at least some example embodiments, if this occurs, the electronic device 201 may provide notification that the second application is not compatible for installation. For example, in at least some example embodiments, the second application may display a notification on the display 204 of the electronic device 201 that the second application is not compatible for installation on the electronic device 201.

In at least some example embodiments, at 310, personal identification information 300 which was received by a first application may be used to configure a second application. That is, the second application may be configured using the personal identification information 300. Configuring the second application may for example, include changing or setting configurations, user accounts, settings, defaults and/or preferences of the second application and/or logging into a user account.

By way of example, in at least some example embodiments in which the second application is an instant messaging application, the electronic device 201 may configure the instant messaging application based on instant messaging account information 309 included in the personal identification information 300.

Similarly, an email application may be configured based on email account information, such as an email address 331 (and possibly a password).

Similarly, a user's mailing address 341 could be used to configure location information associated with a web browser, email account, map, etc. By way of example, the electronic device 201 may add an address, such as a home address and/or work address as a location to a travel application. The travel application may for example, be a navigation application such as a global positioning system (GPS) application. In at least some example embodiments, the address may be added as a favourite location or as a point-of-interest in the travel application. In some example embodiments, the travel application is a traffic reporting application, such as BlackBerry Traffic™ which is configured to provide traffic information. By way of example, the travel application may be configured to provide an estimated time of arrival to a destination, provide information regarding traffic and/or road closures, and/or to suggest a driving route. In such example embodiments, the address information may be added to the travel application to allow a user to easily select a home and/or work destination.

While FIG. 3 illustrates a method 301 which includes features of downloading the second application (at 306), installing the second application (at 308) and configuring the second application (at 310), in other example embodiments, one or more of these features may not be included. For example, in some example embodiments, a second application may already exist on the electronic device, in an uninstalled state, when the electronic device 201 makes the determination at 304 as to whether the second application should be loaded onto the electronic device 201. In such example embodiments, 306 may be omitted and the method 301 may install the second application at 308 without first downloading the second application at 306.

Example Embodiment with Input Interface Assisted Features

Figure 4:
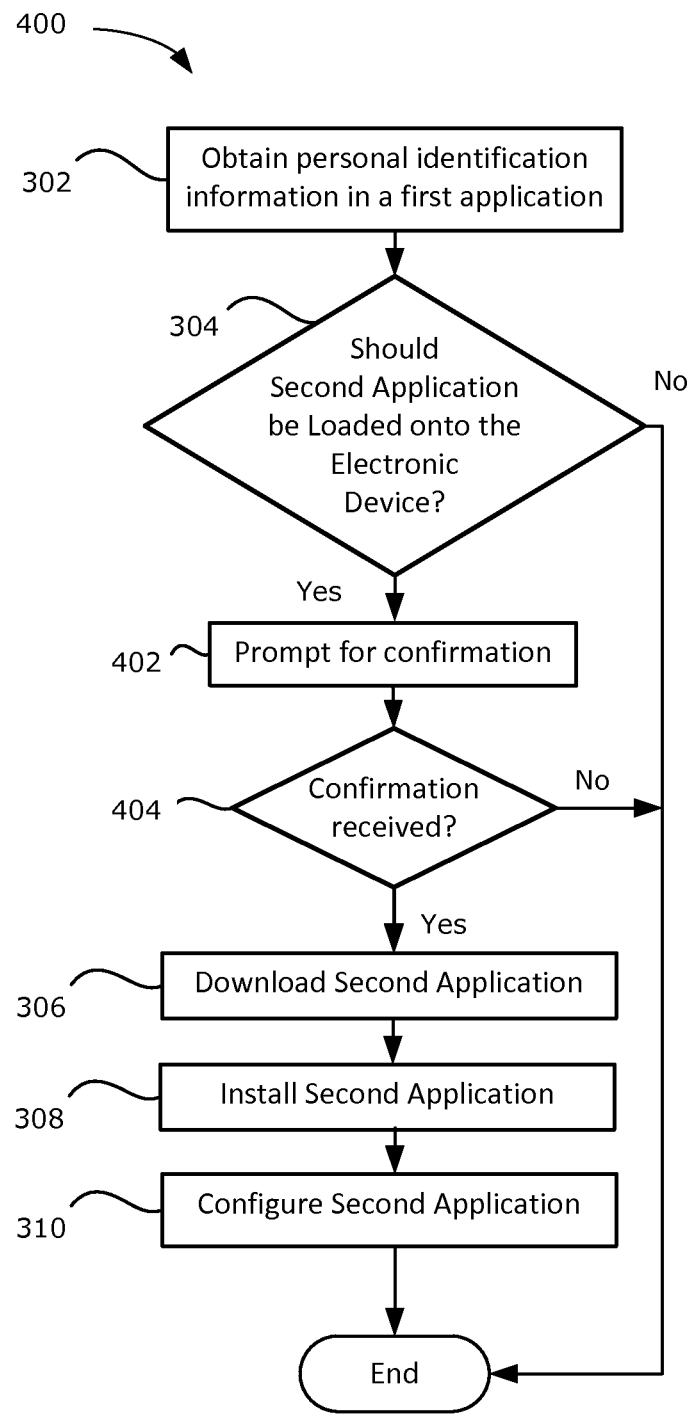
FIG. 4 is a flowchart illustrating an example method of determining whether an application should be loaded based on personal identification information in accordance with example embodiments of the present disclosure.

While, in some example embodiments the download (at 306), installation (at 308), and/or configuration (at 310) of the second application may occur automatically, in other example embodiments, further user input may be required from a user via an input interface 206 in order to download, install and/or configure the second application on the electronic device 201. Referring to FIG. 4, one such example embodiment is illustrated. The method 400 includes, at 302, obtaining personal identification information 300 in a first application and at 304, determining, based on the personal identification information 300 and one or more predetermined rules, whether a second application should be loaded onto the electronic device 201. 302 and 304 are discussed in greater detail above with reference to FIG. 3.

If at 304, the electronic device 201 determines that the second application should be loaded onto the electronic device 201, then at 402, the electronic device 201 presents a prompt via an output interface 205 of the electronic device, such as the display 204, to request confirmation to download, install and/or configure the second application on the electronic device 201. The prompt, may in various example embodiments ask the user to confirm or cancel the download, installation and/or configuration of the second application.

Next, at 404, confirmation may be received via an input interface 206 associated with the device 201. The input interface 206 may for example, be a trackpad, trackball, keyboard, or touchscreen. If confirmation is received (which is determined at 404), the electronic device 201 downloads, installs and/or configures the second application on the electronic device 201 in the manner described above with reference to 306, 308, 310 of FIG. 3. If no confirmation is received at 404 (i.e. if the electronic device 201 receives an instruction from the user to not to install the second application on the electronic device 201), then the method 400 ends without downloading, installing and/or configuring the second application on the electronic device 201.

Determining Whether Instant Messaging Application Should be Loaded

As noted previously, in some example embodiments, the electronic device 201 may determine whether the personal identification information 300 specifies instant messaging account information 309 (FIG. 2) (i.e. whether it includes any instant messaging account information 309) and/or whether it specifies instant messaging account information which is associated with a predetermined instant messaging provider 350 (FIG. 2) (i.e. whether it includes instant messaging account information for a specific provider, such as Yahoo Messenger™ account information). If so, then the electronic device 201 may determine that an instant messaging application (such as an instant messaging application associated with the instant messaging provider 350) should be loaded onto the electronic device 201.

Figure 5:
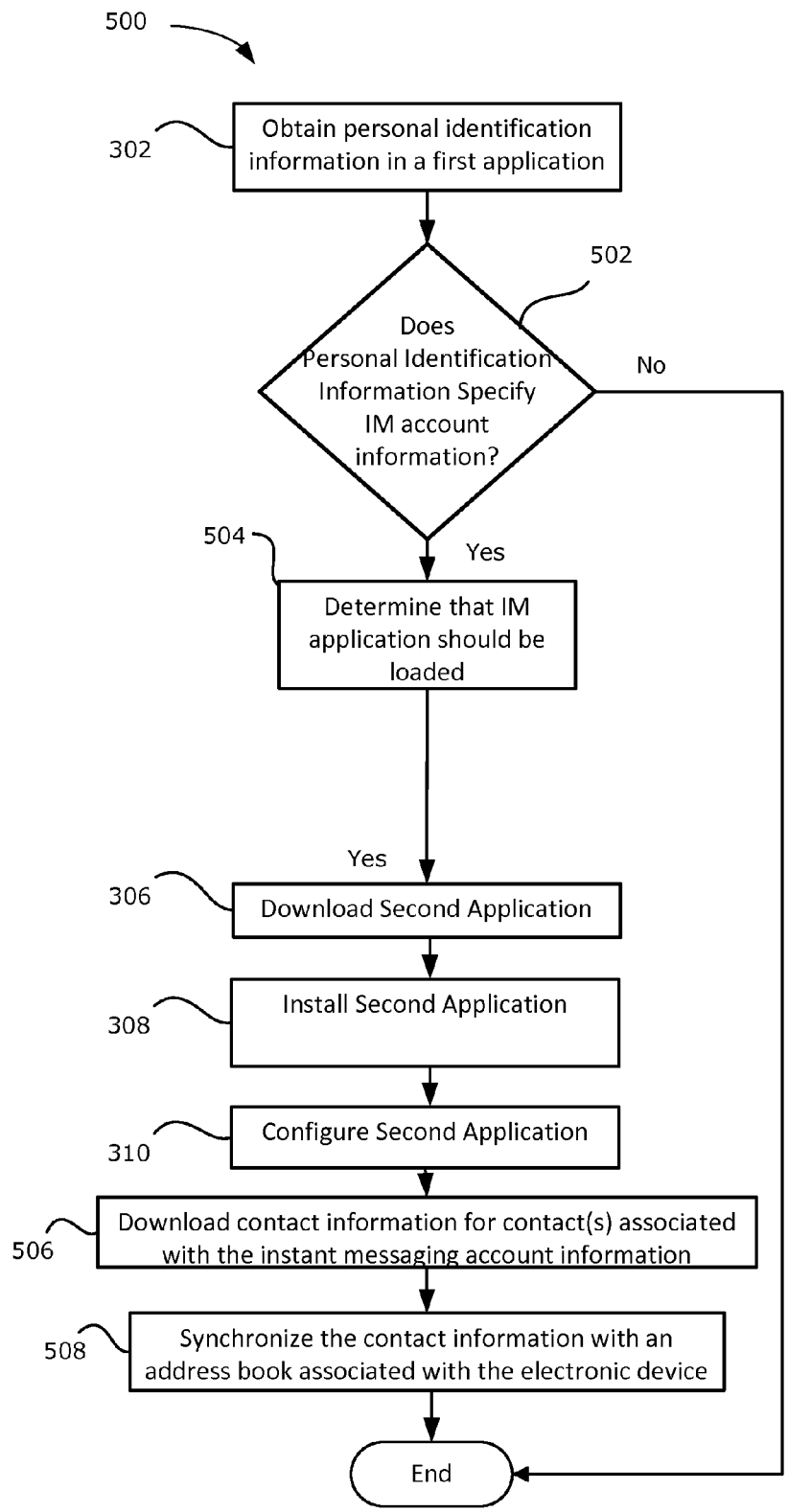
FIG. 5 is a flowchart illustrating an example method of determining whether an application should be loaded based on personal identification information in accordance with example embodiments of the present disclosure.

Referring now to FIG. 5, one such example method 500 is illustrated. The method 500 may include features 302, 306, 308, 310 which are discussed in greater detail above with reference to FIG. 3. In the method 500 of FIG. 5, the application manager 226 includes a predetermined rule which specifies that an instant messaging application should be loaded onto the electronic device if instant messaging account information is specified in the personal identification information. In some such example embodiments, when determining whether the second application should be loaded onto the electronic device 201, the electronic device 201 determines, at 502, whether the personal identification information 300 specifies instant messaging account information 309. If the personal identification information 300 specifies instant messaging account information 309, then the electronic device 201 may determine (at 504) that an instant messaging application should be loaded onto the electronic device 201. If the personal identification information 300 does not specify instant messaging account information 309, then the electronic device 201 may determine that an instant messaging application should not be loaded onto the electronic device 201. If the electronic device 201 determines (at 504) that an instant messaging application should be loaded onto the electronic device 201, it may download, install and/or configure the instant messaging application at 306, 308 and/or 310 in the manner described above with reference to FIG. 3.

In at least some example embodiments, if the personal identification information specifies instant messaging account information, the electronic device 201 may download contact information for one or more contacts associated with the instant messaging account information at 506.

In downloading the contact information, the electronic device 201, may retrieve a list of contacts from a network, and/or a server, a system and/or another device across a network storing the list of contacts associated with the instant messaging account information. In at least some example embodiments, contact information is stored on a server, such as a remote server, of the entity hosting the instant messaging application. In such example embodiments, the electronic device 201 retrieves the contact information from the particular server associated with the instant messaging application.

The contact information may include one or more account contact entries. An account contact entry may include information similar to the personal identification information 300 but, represents information associated with a contact rather than the user of the electronic device 201. The account contact entry may include a plurality of fields with field entries associated with each field. For example, one or more of a name field, a mailing address field, an email address field and a phone number field with corresponding field entry information may be included. The account contact entry may also include other fields for storing other field entry information not specifically listed herein.

In at least some example embodiments (not shown), further user input may be required via an input interface 206 in order to download the contact information. The electronic device 201 may present a prompt via, for example, the display 204 of the electronic device 201 to request a user to enter a password associated with the instant messaging account in order to download the contact information. If a password is not entered or an incorrect password is entered, the electronic device 201 may not download the contact information.

Next at 508, the electronic device 201 synchronizes the contact information with an address book associated with the electronic device 201. One or more applications 224 stored on the electronic device 201 may perform the functions of an address book. The application may be implemented as a separate stand-alone application or as part of another application including the application manager 226. A separate address book application in performing the function of an address book may allow contact entries to be created and stored in memory, for example the flash memory 244, of the electronic device 201. In at least some example embodiments, the address book application may permit one or more contact entries to be stored in a data store in the data area 227 of memory. The address book application may access the contact entries in the data store. In at least some example embodiments, one or more other applications may access the contact entries in the data store.

The electronic device 201, in performing the synchronization process, synchronizes the information in the account contact entries included in the downloaded contact information with the information in the contact entries stored in a data store of the electronic device 201. The contact entries may be updated and modified, and/or new contact entries may be created based on the information in the account contact entries. For example, in at least some example embodiments, the electronic device 201 may search the contact entries for a full name corresponding to a full name in an account contact entry. If a contact entry shares a full name with an account contact entry, the electronic device 201 may synchronize the information in that contact entry with the information in that account contact entry by modifying, adding and/or deleting information in the contact entry to match the information in the account contact entry. However, if a contact entry does not share a full name with an account contact entry, the electronic device 201 may create a new contact entry matching the information in that account contact entry.

In the example embodiment of FIG. 5, a determination was made by the electronic device 201 at 502 regarding whether the personal identification information specified instant messaging account information. If so, then the electronic device determined (at 504), that an instant messaging application should be loaded.

In another example embodiment, at 502, the electronic device 201 may determine whether instant messaging account information 309 associated with a specific instant messaging provider is included in the personal identification information 300 and if such information is included, the electronic device 201 may determine that a specific instant messaging application associated with that provider be downloaded.

In some example embodiments, the instant messaging account information 309 may be received in such a way that it is associated with a specific provider. For example, each field which allows a user to input instant messaging account information may be associated with a specific instant messaging provider. For example, a field may be provided to allow a user to input MSN Messenger™ account information and another field may be provided to allow a user to input Yahoo Messenger™ account information. This allows the electronic device 201 to determine whether instant messaging account information associated with a specific instant messaging provider is included.

In other example embodiments, in order to identify the instant messaging provider associated with instant messaging account information, the electronic device 201 searches a plurality of instant messaging applications in order to correlate the instant messaging account information 309 with an instant messaging application. For example, the electronic device 201 will use the username 351 and password 352 as specified in the instant messaging account information 309 to check if the information correlates to an account in a searched instant messaging application (e.g. by attempting to log into the instant messaging service provided by each provider with the specific instant messaging account information). If the information correlates to an account in a searched instant messaging application, then the particular instant messaging provider is identified.

Determining Whether Email Application Should be Loaded

As noted previously, in at least some example embodiments, the electronic device 201 may determine whether the personal identification information 300 includes an email address of a specific predetermined type. If so, then the electronic device 201 may determine that an email application associated with that type of email address should be loaded on the electronic device 201.

Figure 6:
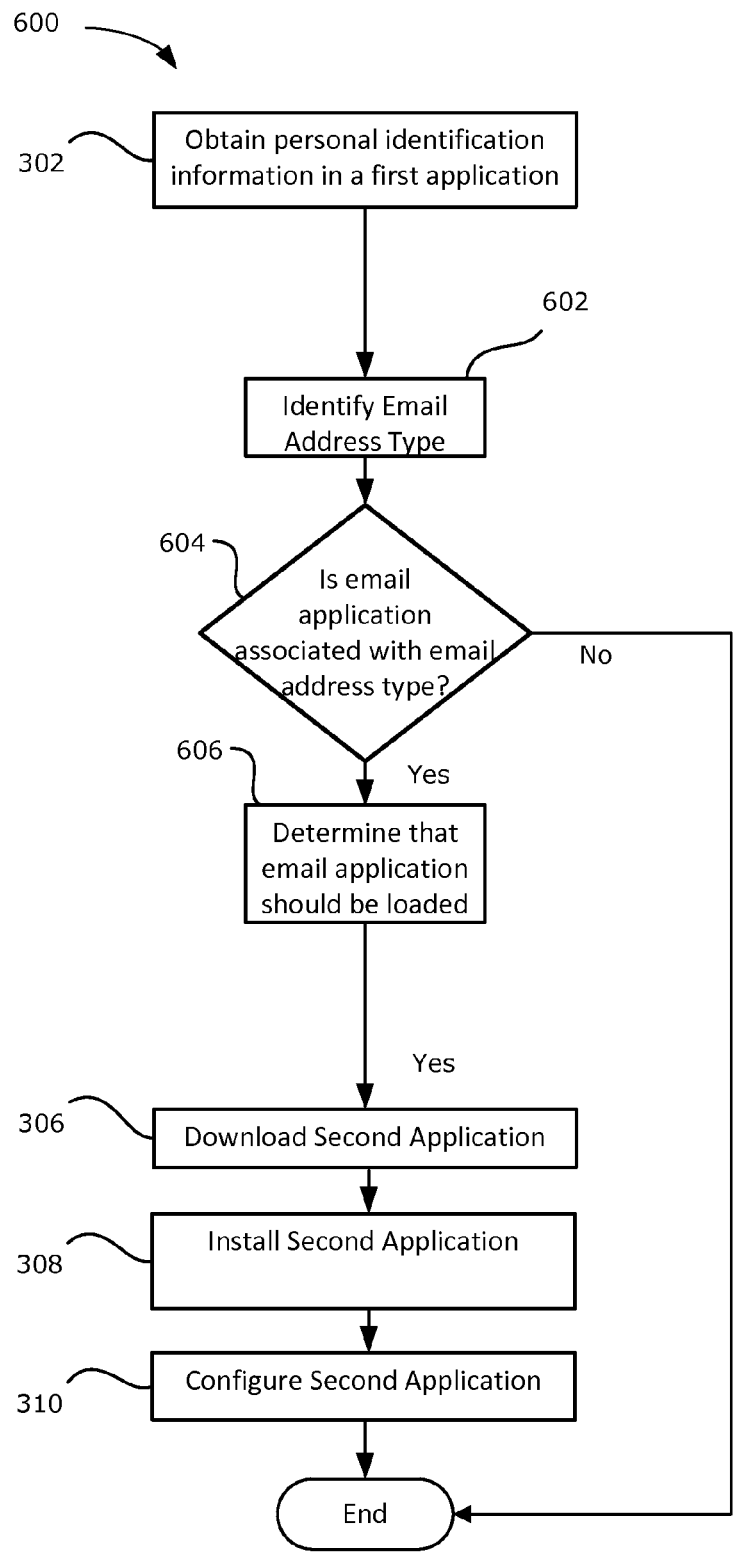
FIG. 6 is a flowchart illustrating an example method of determining whether an application should be loaded based on personal identification information in accordance with example embodiments of the present disclosure.

Referring now to FIG. 6, one such example method 600 is illustrated. The method 600 may include features 302, 306, 308, 310 which are discussed in greater detail above with reference to FIG. 3. In the method 600 of FIG. 6, the application manager 226 includes a predetermined rule which associates an email application with an email address type. That is, a first email application may be associated with a first email address type and in at least some example embodiments, a second email application (which is not the same as the first email application) may be associated with a second email address type (which is not the same as the first email address type).

In the method 600 of FIG. 6, when the electronic device 201 determines whether a second application should be loaded onto the electronic device 201, the electronic device identifies an email address type associated with an email address included in the personal identification information 300 (at 602). The electronic device 201 may identify the email address type based on a domain name portion 331*b* of an email address.

That is, in order to determine the email address type of an email address in the personal identification information 300, in at least some example embodiments, the electronic device 201 searches the personal identification information 300 for a domain name portion of an email address 331. An email address has two parts. The first part, which precedes the "@" symbol, is the local-part portion 331a of the email address and may be the username of the recipient. The part after the "@" symbol is the domain name portion 331b to which the email message is sent. For example, in the example email address of FIG. 2 (jdoe@domainname.com), "jdoe" is the local-part portion and "domainname.com" is the domain name portion. At 602, the electronic device 201 may search the personal identification information 300 for a domain name portion and based on the domain name portion, identify an email address type.

Then, at 604, the electronic device 201 determines whether the one or more predetermined rules associate an email application with the email address type identified at 602. If so, then at 606, the electronic device 201 may determine that an email application associated with the email address type identified at 602 should be loaded onto the electronic device 201. If the electronic device 201 determines that the predetermined rules do not associate an email application with the email address type identified at 602, then the method 600 may end.

If the electronic device 201 determines that an email application should be loaded onto the electronic device 201, then at 306, 308 and 310 it may download, install, and/or configure the email application in the manner described above with reference to FIG. 3.

The email application, when executed, may create a mailbox platform correlating to the email address. The mailbox platform may replicate the functions of a domain (i.e. a mail box provider) hosting an email address, and allow a user of the electronic device 201, to access the email address via the mailbox platform.

Configuring Applications

As noted in the discussion of FIGS. 3 to 6 above, in at least some example embodiments, a second application may be configured based on personal identification information 300 obtained within a first application. In the examples of FIGS. 3 to 6, such configuration occurred as a result of a determination being made on the electronic device 201 that the second application should be loaded onto the electronic device 201.

However, in other example embodiments, personal identification information received within a first application may be used to configure a second application which may already be downloaded and/or installed on the electronic device 201.

Figure 7:
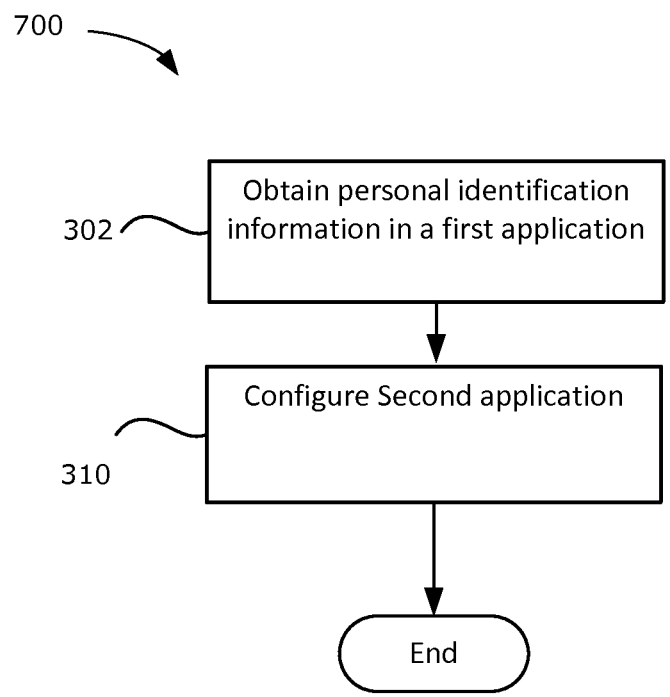
FIG. 7 is a flowchart illustrating an example method of configuring a second application based on personal identification information obtained within a first application in accordance with example embodiments of the present disclosure.

Referring now to FIG. 7, an example embodiment of one such method 700 is illustrated in flowchart form.

First, at 302, personal identification information is obtained within a first application, such as an operating system 222. 302 is discussed in greater detail above with reference to FIG. 3.

Next, at 310, the electronic device 201 configures a second application based on the personal identification information obtained in the first application. 310 is discussed in greater detail above with reference to FIG. 3.

Configuration Based on Address

In at least some example embodiments, as part of the configuration process at 310, the electronic device 201 determines whether there is a mailing address 341 included in the personal identification information 300.

In at least some example embodiments, the personal identification information 300 may have one or more mailing address fields in which a mailing address 341 may be stored.

In at least some example embodiments, at 310, the electronic device 201 examines the personal identification information 300 to determine whether the mailing address field is populated with a mailing address 341. If the mailing address field is populated with a mailing address 341, then the electronic device 201 may determine that the personal identification information 300 includes a mailing address 341. If however, no mailing address 341 is included in the mailing address field, then the electronic device 201 may determine that the personal identification information 300 does not include a mailing address 341.

If the electronic device 201 is unable to identify a mailing address 341 (e.g. because a mailing address 341 is not specified in the personal identification information 300), the method 700 may end. If a mailing address 341 is specified in the personal identification information 300, the electronic device 201 may use the mailing address to configure a second application (i.e. an application which is not the application through which the personal identification information 300 was initially input). For example, in at least some example embodiments, if a mailing address is specified in the personal identification information then, at 310, a web browser associated with the electronic device 201 may be customized based on the mailing address.

In some example embodiments, when customizing the web browser, the electronic device 201, configures localization settings and preferences of the web browser to be associated with the geographic location of the mailing address 341. The configured web browser is localized for the geographic location as specified in the mailing address 341. That is, the web browsing experience could be tailored based on the geographic location. For example, in at least some example embodiments, a configured web browser accessing a search engine such as Yahoo Search™, Google Search™, MSN Search™, etc. may display search results associated with the specific geographic location as specified in the mailing address 341. In such example embodiments, a search of the example term, "seafood restaurants" in a search engine, may cause the web browser to search and display results of seafood restaurant webpage links which are around the geographic location as specified in the mailing address 341.

Similarly, map data sent from a mapping server could be customized based on the geographic location. For example, when a user navigates to a mapping website via the web browser, the mapping website may initially send a map to the electronic device based on the geographic location.

A mailing address 321 may be used to configure other applications instead of or in addition to the web browser. For example, in some example embodiments, the electronic device 201 may determine whether the personal identification information 300 includes a home address and/or a work address. If a home address and/or work address are included, the electronic device 201 may add the home address and/or the work address as a location to a travel application. The travel application may for example, be a navigation application such as a global positioning system (GPS) application. In at least some example embodiments, the address may be added as a favourite location or as a point-of-interest in the travel application. In some example embodiments, the travel application is a traffic reporting application, such as BlackBerry Traffic™ which is configured to provide traffic information. By way of example, the travel application may be configured to provide an estimated time of arrival to a destination, provide information regarding traffic and/or road closures, and/or to suggest a driving route. In such embodiments, at 310, the address information may be added to the travel application to allow a user to easily select a home and/or work destination.

Configuration Based on Interest

In at least some example embodiments, as part of the configuration process at 310, the electronic device 201 determines whether one or more interest fields 361 is included in the personal identification information 300.

That is, in at least some example embodiments, the personal identification information 300 may have one or more interest fields in which an activity of interest 361 (such as for example, hobbies, political affiliation, religious affiliation, favourite books, favourite movies, celebrities of interest, social groups) to the user may be specified. In at least some example embodiments, at 310, the electronic device 201 examines the personal identification information 300 to determine whether the interest field is populated with an interest 361. If the interest field is populated with an interest 361, then the electronic device 201 may determine that the personal identification information 300 includes an interest 361. If however, no interest 361 is included in the interest field, then the electronic device 201 may determine that the personal identification information 300 does not include an interest 361.

If an interest 361 is not specified in the personal identification information 300, the method 700 may end. In one example embodiment, if an interest 361 is specified, then at 310, the electronic device 201 may configure a second application to present a RSS feed associated with the interest 361. For example, an RSS reader may be configured to subscribe to an RSS feed associated with the interest.

RSS is a web feed format used to publish web content in a standardized format. A RSS feed may include full or summarized content of the associated webpages. RSS feeds may be constantly updated based on a user's interests. RSS feeds may be read by an RSS Reader. The RSS reader aggregates the web content in a centralized location for easy viewing by a web user. The RSS reader provides a user interface to monitor and read the feeds. The RSS reader may further constantly update the feeds based on a user's interests. Example RSS readers include Amphetadesk™, FeedReader™, NewsGator™, My Yahoo™, Google Reader™, etc.

In configuring the second application to present a RSS feed, in at least some example embodiments, the electronic device 201 may input the specified interest 361 in a RSS reader associated with the second application. The RSS reader aggregates web content associated with the specified interest and presents the aggregated web content as RSS feeds. In at least some example embodiments, a graphical user interface (GUI) icon, such as a feed icon, is presented in the second application in order to provide a user with an interface to access the RSS feeds. A GUI is a type of user interface that allows the user to interact with an electronic device and/or an application utilizing images rather than text commands. The GUI represents information and actions available to the user through graphical icons and visual indicators. The GUI can be implemented by various programming languages including JavaScript, .NET, C++, etc. A selection of the feed icon displays one or more RSS feeds associated with the specified interest 361.

The method 700 of FIG. 7 may use other types of personal identification information 300 to customize a second application apart from the personal identification information 300 specifically discussed in the examples above. Furthermore, the application which is customized may be a different application from the applications specifically discussed above.

While the present application is primarily described in terms of methods, a person of ordinary skill in the art will understand that the present application is also directed to various apparatus such as a handheld electronic device including a mobile communications device. The handheld electronic device includes components for performing at least some of the example aspects and features of the described methods, be it by way of hardware components (such as the memory, for example the flash memory 244, and/or the processor 240), software or any combination of the two, or in any other manner. Moreover, an article of manufacture for use with the apparatus, such as a pre-recorded storage device or other similar computer readable medium including program instructions recorded thereon, or a computer data signal carrying computer readable program instructions may direct an apparatus to facilitate the practice of the described methods. It is understood that such apparatus, articles of manufacture, and computer data signals also come within the scope of the present application.

The term "computer readable medium" as used herein means any medium which can store instructions for use by or execution by a computer or other computing device including, but not limited to, a portable computer diskette, a hard disk drive (HDD), a random access memory (RAM), a read-only memory (ROM), an erasable programmable-read-only memory (EPROM) or flash memory, an optical disc such as a Compact Disc (CD), Digital Versatile Disc (DVD) or Blu-ray™ Disc, and a solid state storage device (e.g., NAND flash or synchronous dynamic RAM (SDRAM)).

Example embodiments of the present application are not limited to any particular operating system, system architecture, mobile device architecture, server architecture, or computer programming language.

The various embodiments presented above are merely examples and are in no way meant to limit the scope of this application. Variations of the innovations described herein will be apparent to persons of ordinary skill in the art, such variations being within the intended scope of the present application. In particular, features from one or more of the above-described example embodiments may be selected to create alternative example embodiments including a sub-combination of features which may not be explicitly described above. In addition, features from one or more of the above-described example embodiments may be selected and combined to create alternative example embodiments including a combination of features which may not be explicitly described above. Features suitable for such combinations and sub-combinations would be readily apparent to persons skilled in the art upon review of the present application as a whole. The subject matter described herein and in the recited claims intends to cover and embrace all suitable changes in technology.

The invention claimed is:

1. A method implemented by a processor of an electronic device, the method comprising:
    obtaining personal identification information in a first application; and
    based on the personal identification information and one or more predetermined rules, determining if a second application should be loaded onto the electronic device, wherein determining if a second application should be loaded onto the electronic device comprises determining if messaging account information included in the personal identification information satisfies one or more predefined criteria and if so, determining that a messaging application associated with the messaging account information should be loaded onto the electronic device.

2. The method of claim 1, wherein obtaining the personal identification information in the first application comprises obtaining the personal identification information during a first start of the first application.

3. The method of claim 1, wherein the first application comprises an operating system.

4. The method of claim 1, further comprising: if it is determined that the second application should be loaded onto the electronic device, installing the second application on the electronic device.

5. The method of claim 4, wherein the installation of the second application is performed in response to obtaining the personal identification information.

6. The method of claim 1, further comprising: if it is determined that the second application should be loaded onto the electronic device, downloading the second application.

7. The method of claim 6, wherein the downloading of the second application is performed in response to obtaining the personal identification information.

8. The method of claim 1, further comprising:
configuring the second application based on the personal identification information.

9. The method of claim 1, wherein the one or more predetermined rules specify that an instant messaging application should be loaded onto the electronic device if instant messaging account information is specified in the personal identification information, and wherein, determining if a second application should be loaded onto the electronic device comprises determining if the personal identification information specifies instant messaging account information and if so, determining that an instant messaging application should be loaded onto the electronic device.

10. The method of claim 9, further comprising, if the personal identification information specifies instant messaging account information:
downloading contact information for one or more contacts associated with the instant messaging account information; and
synchronizing the contact information with an address book associated with the electronic device.

11. The method of claim 1, wherein the one or more predetermined rules associate an email application with an email address type, and wherein determining if a second application should be loaded onto the electronic device comprises:
identifying an email address type associated with an email address of the messaging account information; and
determining if the one or more predetermined rules associates an email application with the identified email address type and if so, determining that the email application associated with the identified email address type should be loaded onto the electronic device.

12. The method of claim 11, wherein the email address type is identified based on a domain name portion of an email address.

13. The method of claim 1, wherein the personal identification information is in a vCard format.

14. The method of claim 1, wherein the personal identification information comprises one or more of: a name, a mailing address, an email address, instant messaging account information and an interest.

15. The method of claim 1, wherein the electronic device further comprises an output interface and an input interface, and wherein the method further comprises:
presenting a prompt via the output interface for requesting confirmation to install the second application; and
if confirmation is received from the input interface, installing the second application.

16. An electronic device comprising:
a memory; and
a processor coupled with the memory, the processor being configured to execute computer-readable instructions stored on a non-transitory medium to:
obtain personal identification information in a first application; and
based on the personal identification information and one or more predetermined rules, determine if a second application should be loaded onto the electronic device,
wherein determining if a second application should be loaded onto the electronic device comprises determining if messaging account information included in the personal identification information satisfies one or more predefined criteria and if so, determining that a messaging application associated with the messaging account information should be loaded onto the electronic device.

17. The electronic device of claim 16, wherein the electronic device is a mobile communications device.

18. A method implemented by a processor of an electronic device, the method comprising:
obtaining personal identification information in a first application; and
configuring a second application based on the personal identification information obtained in the first application,
wherein configuring the second application comprises determining if a mailing address is specified in the personal identification information and if the mailing address is specified in the personal identification information, customizing a web browser associated with a geographic location of the mailing address.

19. The method of claim 18, wherein configuring the second application comprises:
determining if an interest is specified in the personal identification information; and
if the interest is specified in the personal identification information, subscribing to a Rich Site Summary feed associated with the interest.

* * * * *